United States Patent [19]

Boaz

[11] Patent Number: 5,090,983
[45] Date of Patent: Feb. 25, 1992

[54] METAL ENRICHED SCRATCH RESISTANT CERAMIC PAINT

[75] Inventor: Premadaram T. Boaz, Livona, Mich.

[73] Assignee: Ford Motor Company, Dearborn, Mich.

[21] Appl. No.: 551,362

[22] Filed: Jul. 12, 1990

[51] Int. Cl.⁵ .......................................... C03B 23/035
[52] U.S. Cl. ..................................... 65/25.4; 65/106; 65/60.5; 65/60.4; 106/19
[58] Field of Search .................. 65/24, 107, 106, 60.5, 65/60.51, 60.1, 60.53, 60.4, 25.2, 25.4, 182.2; 106/19

[56] References Cited

U.S. PATENT DOCUMENTS

| | | |
|---|---|---|
| 3,361,552 | 1/1968 | Ritter, Jr. . |
| 3,402,036 | 9/1968 | McMaster . |
| 4,274,857 | 6/1981 | Wolfe . |
| 4,432,782 | 2/1984 | Seymour . |
| 4,612,031 | 9/1986 | Bennett ................................ 65/106 |
| 4,684,389 | 8/1987 | Boaz . |
| 4,770,685 | 9/1988 | Boaz . |
| 4,828,596 | 5/1989 | Reinherz . |
| 4,954,153 | 9/1990 | Coleman ............................ 65/60.53 |

*Primary Examiner*—Richard V. Fisher
*Assistant Examiner*—John M. Hoffmann
*Attorney, Agent, or Firm*—Charles H. Ellerbrock; Roger L. May

[57] ABSTRACT

A metal powder is added to ceramic paint to prevent scratches on the painted surfaces of glass sheets formed by the gas hearth process.

11 Claims, No Drawings

METAL ENRICHED SCRATCH RESISTANT CERAMIC PAINT

FIELD OF THE INVENTION

This invention relates generally to metal powder-containing ceramic paint compositions that resist the formation of scratches when applied to glass sheets which are subsequently formed in a gas hearth furnace.

BACKGROUND OF THE INVENTION

Ceramic paint compositions are generally known to those ordinarily skilled in the art of applying ceramic paints to automotive and architectural glazings. Such ceramic paints are used, for example, to form opaque borders around the peripheral marginal surfaces of glazings used as windshields, sidelites, and backlites of motor vehicles.

Ceramic paints or pastes generally contain a mixture of metal oxides which together act as a coloring agent. The metal oxides are non-reactive with one another, as well as non-reactive with other compounds contained in the ceramic paint or the glass to which the ceramic paint is applied, at temperatures up to about 1,300° F. The mixture of metal oxides may be adjusted so as to achieve a specific color for the ultimately produced fired ceramic paint field. For example, the opaque peripheral marginal paint bands fired onto automotive glazings are generally black.

Additionally, the ceramic paints generally known in the art contain one or more low melting glass frits, which melt at temperatures below 1,300° F. These low melting glass frits are the materials which ultimately fuse the ceramic paint together, and to the glass sheet, to insure that the ceramic paint remains affixed to the glass sheet after being cooled to room temperature.

A vehicle is also generally mixed with the metal oxides and glass frit, to allow the ceramic paint to be applied to the surface of a glass sheet by conventional paint application processes. Generally, organic vehicles, e.g., pine oil, mineral oils, low molecular weight petroleum fractions, and the like, are used to allow the ceramic paint to be applied to the glass surface by brushing, spreading, or screen printing.

The ceramic paint compositions generally known in the art are, however, susceptible to scratching when applied to the surface of a glass sheet which is thereafter formed in a gas hearth furnace. The ceramic paint is applied to that surface of the glass sheet which is formed into a concave configuration by advancing over increasingly curved gas hearth forming blocks while the glass sheet rides on a cushion of hot gasses which elevate and maintain the glass sheet above its softening temperature. The distal portions of the glass sheet often unintentionally slidingly engage the surface of the gas hearth forming blocks as the glass sheet advances through the gas hearth furnace. Where those distal portions of the glass sheet have been previously coated with a ceramic paint, the paint is scratched. Thus, automotive and architectural glazings, which have been coated with a ceramic paint and thereafter formed in a gas hearth furnace, often have permanent unsightly surface abrasions on their painted portions.

U.S. Pat. No. 3,361,522 to Ritter, Jr. discloses a method for bending horizontally conveyed glass sheets between opposed shaping molds. To prevent marring of the glass surfaces, the press bending molds are covered with a relatively soft, non-abrasive, heat resistant material such as, for example, asbestos or fiberglass cloth. The patent does not suggest that the use of asbestos or fiberglass would aid in preventing the scratching of painted surfaces on glass sheets which are formed between press bending molds or formed by the gas hearth process.

U.S. Pat. No. 4,274,857 to Wolfe discloses a method for treating the engagement surfaces of press bending molds, to reduce the likelihood of marring the ceramic painted portions of a glass sheet, and to facilitate the removal of the engagement surfaces of the press bending molds from the painted portions of the glass sheet. A boron nitride compound is sprayed or brushed onto the fiberglass covers of the engagement surfaces of the press bending molds. This patent does not suggest the use of a ceramic paint adjuvant to eliminate scratches in the painted surfaces of glass sheets formed by the gas hearth process.

U.S. Pat. No. 4,432,782 to Seymour discloses a method and apparatus for shaping and conveying glass sheets in a gas hearth process, wherein certain surfaces within the furnace are coated with various materials that do not mar glass sheets which come into sliding contact therewith. The preferred coating material is boron nitride, although graphite, magnesium oxide, and titanium oxide are also disclosed. The patent does not suggest that ceramic painted surfaces of the glass sheets would similarly be protected from marring. Nor does the patent disclose a ceramic paint additive to prevent the formation of scratches which would otherwise result form such sliding contact.

U.S. Pat. No. 4,828,596 to Reinherz discloses glass enamel coating compositions, comprising a glass frit, a vehicle, and either copper sulfide or copper sulfate which acts as an anti-stick agent for separating the engagement surfaces of press bending molds away from the painted surfaces of the glass sheets during the forming operation. The patent also discloses that certain refractory materials such as zirconium oxide may be added to the glass enamel coating compositions to increase abrasion resistance. The patent does not suggest that adjuvants other than refractory materials may be added to a ceramic paint to prevent the formation of scratches on the painted surfaces of glass sheets formed by the gas hearth process, nor that the disclosed refractory materials would provide abrasion resistance apart from their combination with copper sulfide or copper sulfate.

Finally, U.S. Pat. No. 4,684,389 to Boaz discloses a method for forming a glass sheet having ceramic paint thereon, wherein finely divided zinc metal powder is included in the paint composition to prevent sticking of the ceramic paint to the engagement surfaces of press bending molds. The patent does not suggest that such a ceramic paint composition would be effective to prevent the formation of scratches in the painted portions of glass sheets formed by the gas hearth process. The patent likewise does not suggest that ceramic paint compositions containing zinc metal powder would be useful in any glass sheet forming processes other than ones such as press bending wherein the forming surfaces are intentionally brought into engagement with the painted surfaces of the glass sheet during the forming operation.

It must be noted that the prior art referred to hereinabove has been collected and examined only in light of the present invention as a guide. It is not to be inferred that such diverse art would otherwise be assembled absent the motivation provided by the present invention, nor that the cited prior art when considered in combination suggests the present invention absent the teachings herein.

It would be desirable to form ceramic painted glass sheets by the gas hearth process, wherein the painted portions of the ultimately produced formed glass sheets would be free from surface scratches.

SUMMARY OF THE INVENTION

Accordant with the present invention, a process for preparing a formed glass sheet having a fired ceramic Paint field thereon, the fired ceramic paint field being free from surface defects, has surprisingly been discovered, comprising the steps of:

A. providing a glass sheet, having a surface;
B. applying to at least a portion of the surface a ceramic paint composition including a metal powder; and
C. heating the glass sheet and metal powder-containing ceramic paint thereon in a gas hearth furnace including gas hearth forming blocks, so as to form the glass sheet, and vitrify and simultaneously fuse the ceramic paint to the glass sheet, wherein the metal powder addition to the ceramic paint is effective to prevent surface defects on the fired ceramic paint field which otherwise would result from sliding engagement between the ceramic paint and the gas hearth forming blocks.

The present inventive process for preparing a formed glass sheet having a fired ceramic paint field thereon is particularly useful for manufacturing automotive and architectural glazings having opaque concealment bands at their perimeters.

DETAILED DESCRIPTION OF THE PREFERRED EMBODIMENT

The invention is directed to a process for forming a glass sheet having a fired ceramic paint field thereon by the gas hearth process, wherein the fired ceramic paint field is free from surface defects. By the term "field" as it is used herein is meant that the paint is applied to a portion of the surface of the glass sheet, so as to form areas of the glass sheet which are coated with a layer of the paint as distinguished from areas of the glass sheet where the glass remains uncoated. It is well known in the art of preparing formed glass sheets by the gas hearth process that painted surfaces of the glass sheets are often scratched by inadvertent sliding engagement between the ceramic paint and the gas hearth forming blocks as the glass sheets advance through the gas hearth furnace However, it has been discovered that ceramic paint compositions comprising glass frit, a pigment, a vehicle, and a quantity of a metal powder are effective to prevent the formation of such surface defects. By "surface defects" as the term is used herein is meant scratches and abrasion marks which are commonly formed on a soft surface when brought into sliding engagement with a hard surface.

Suitable glass frits for preparing the ceramic paint compositions of the present invention include one or more glass frits prepared from conventional lead-borosilicate glass compositions that are high in lead content. Alternatively, the frit may comprise a combination of metal oxides selected from the group consisting of oxides of zinc, lead, titanium, zirconium, sodium, boron, lithium, potassium, calcium, aluminum, tin, vanadium, molybdenum, magnesium, iron, manganese, and the like. The frit is prepared by melting the frit batch ingredients at a temperature from about 1650° F. to about 2,900° F., and then quenching the molten frit composition either with the use of water or by pouring the melt between cooled metal rolls rotating in opposite directions. The resulting chunks of frit are then ground into fine particles so as to pass through a 325 U.S. Standard Sieve mesh screen. A lead borosilicate glass frit high in lead content is preferred because it is readily available and relatively inexpensive. The frit is generally added to the ceramic paint composition at a concentration from about 10% to about 60% by weight. Preferably, the concentration of glass frit in the ceramic paint composition is from about 30% to about 50% by weight.

Pigments for use according to the present invention generally comprise metal oxides which together act as a coloring agent for the ceramic paint. These metal oxides include, but are not limited to, the oxides of chromium, cobalt, nickel, manganese, iron, and copper. Mixtures of these metal oxides form various colors, as is well known in the art of glass making. A particularly useful mixture of metal oxides for applying an opaque concealment ceramic paint band to a peripheral marginal surface of an automotive glazing is commonly known in the art as black oxide powder. The metal oxide pigments are non-reactive with one another, as well as non-reactive with other compounds contained in the ceramic paint or the glass to which the ceramic paint is applied, up to temperatures of about 1,300° F. The concentration of pigment in the ceramic paint composition is from about 5% to about 30% by weight. Preferably, the concentration is from about 10% to about 20% by weight. Most preferably, the concentration is about 16% by weight of the ceramic paint composition.

Vehicles suitable for use in the ceramic paint compositions of the present invention generally comprise organic materials which allow the ceramic paint composition to flow at application temperatures. Thus, the ceramic paint composition may be applied to the surface of a glass sheet by any conventional paint application process such as, for example, brushing, spreading, or screen printing. Examples of useful vehicles include pine oil, vegetable oils, mineral oils, low molecular weight petroleum fractions, hot melt materials, ultraviolet radiation curable polymer resins, vinyl resins, thermoplastic resins, polyolefins, solvents, and the like.

A metal powder is added to the ceramic paint composition in an amount effective to prevent the formation of surface defects on the painted portions of glass sheets formed by the gas hearth process. While not wishing to be bound by any particular theory concerning the mechanism by which the metal powder prevents surface defects, it is believed that the particles form an oxide layer on their surfaces at the temperatures encountered in the gas hearth furnace. When the paint slidingly engages a gas hearth forming block, the metal oxide at the surface of the paint is abraded away, thereby exposing the inner portions of the metal particles which immediately reform new layers of metal oxide. In this fashion, the surface defects heal themselves without leaving a visual scar. Suitable metal powders according to the present invention include powders prepared form zinc, aluminum, tin, antimony, lead, and bismuth, as well as alloys and mixtures thereof. A preferred metal powder comprises finely divided zinc metal powder. The metal powder is generally added to the ceramic paint composition in a concentration from about 5% to about 50% by weight. Preferably, the concentration is from about 20% to about 40% by weight of the ceramic paint composition.

The formed glass sheet having the fired ceramic paint field thereon of the present invention is prepared generally by applying the aforementioned metal powder-containing ceramic paint to at least a portion of a surface of a glass sheet, and thereafter advancing the glass sheet through a gas hearth furnace. The glass sheet may be prepared from any type of glass generally known in the art of glass making. Typical glass sheets contemplated for use according to the present invention are soda-lime-silica automotive and architectural glazings, generally produced by the well-known float glass process. However, a fired ceramic paint field free from defects may be formed on any type of glass sheet by the process of the present invention.

In operation, the ceramic paint is applied as a uniform layer to a surface of the glass sheet in a predetermined pattern by a conventional paint application method, e.g., screen printing wherein the ceramic paint is spread across the screen by a squeegee to force the paint through the pattern onto the glass sheet. The predetermined pattern may comprise, for example, an opaque concealment band positioned on a peripheral marginal surface of an automotive glazing. Such concealment bands are well known in the art of automotive glazings as useful for preventing the solar radiation induced degradation of adhesives used to mount the glazings in a vehicle opening, and for concealing attachment hardware and structural components which lie below the edges of the glazing. The band generally extends to the edges of the glazing, and has a width sufficient to conceal the underlying adhesive and structural components, but which is sufficiently narrow to provide maximum vision to occupants of the vehicle. It is known to apply such a band to the surface of an automotive glazing by silk screening a layer of conventional ceramic paint onto the glazing and thereafter firing the ceramic paint. Such a method for applying a ceramic paint by silk screening is more fully set forth in U.S. Pat. No. 4,770,685 to Boaz, which is incorporated herein in its entirety by reference thereto. Clearly, other predetermined patterns may be utilized where applying various ceramic paint fields to glass surfaces, depending upon the ultimate purpose for the fired ceramic paint field.

After the layer of ceramic paint has been applied in a predetermined pattern or field to the surface of the glass sheet, and the ceramic paint has been dried or cured by conventional methods, the glass sheet is introduced into a gas hearth furnace having the paint coated surface apposing the gas hearth forming blocks. The glass sheet is maintained or floated above the gas hearth forming blocks by hot gases emitted from perforations in the blocks. The blocks are flat in the initial zone of the gas hearth furnace, and the calescent glass sheet reaches a softening temperature above its plastic set temperature while advancing thereover. By the term "plastic set temperature" as it is used herein is meant the temperature below which an applied stress will not cause permanent deformation to the glass sheet, and above which the glass sheet is capable of being formed or shaped. Thereafter, the glass sheet enters the forming zone of the gas hearth furnace, wherein the forming blocks become increasingly transversely curved and the apogeal portions of the glass sheet advancing thereover sag under gravity to conform to the curvature thereof. Thus, when the glass sheet reaches the end of the furnace, it is shaped to the full curvature desired. As the glass sheet is formed, the ceramic paint simultaneously is fired by the hot gases which are generally emitted from the forming blocks at a temperature of about 1,200° F. in the forming zone. The operation of a gas hearth furnace is more fully set forth in U.S. Pat. No. 3,402,036, which is incorporated herein in its entirety by reference thereto.

As the glass sheet is formed, the ceramic paint is heated to a temperature and for a time, sufficient to cause the ceramic paint to vitrify and simultaneously fuse to the glass sheet. The required temperature is generally from about 900° F. to about 1,100° F. The time required for vitrification and fusion is generally from about 1 to about 5 minutes. The glass frit is converted to a vitrified phase characterized by a glassy matrix. Simultaneously, the glass frit fuses to the glass sheet. The fused glass frit additionally serves as a binder for the pigment particles.

Because the gap between the forming blocks and glass sheet is very small, the glass sheet is disposed to occasionally engage the forming blocks during its advance through the gas hearth furnace. Where ceramic paint according to the present invention has previously been applied to that portion of the glass sheet which inadvertently contacts the abrasive forming blocks, the metal powder contained in the ceramic paint composition is effective to prevent the formation of surface defects.

The invention is more easily comprehended by reference to specific embodiments which are representative of the invention. It must be understood, however, that the specific embodiments are provided only for the purposes of illustration and understanding and that the invention may be practiced otherwise than as specifically described without departing from its spirit or scope.

EXAMPLES 1-3

Ceramic paint compositions are prepared by admixing the ingredients recited in Table 1. These paints are applied to glass sheets, by a conventional screen printing process, in a predetermined pattern so as to form a concealment band on the peripheral marginal surface of each sheet. Thereafter, the glass sheets are conveyed through a gas hearth furnace where the sheets are formed, and simultaneously the paint is vitrified and fused to the glass sheet.

It is observed that the painted surfaces of the formed glass sheets are free from surface defects such as scratches.

TABLE 1

| | Metal Containing Ceramic Paint Results | | | | |
|---|---|---|---|---|---|
| | Frit[1] % by wt. | Pigment[2] % by wt. | Vehicle % by wt. | Metal[6] % by wt. | Appearance of Painted Surface |
| Example 1 | 23 | 22 | 20[3] | 35 | Free from surface defects. |
| Example 2 | 25 | 20 | 25[4] | 30 | Free from surface defects. |
| Example 3 | 33 | 17 | 25[5] | 25 | Free from surface defects. |
| Compari- | 64 | 16 | 20[4] | -0- | Surface scratches. |

TABLE 1-continued

| Metal Containing Ceramic Paint Results | | | | |
|---|---|---|---|---|
| Frit[1] % by wt. | Pigment[2] % by wt. | Vehicle % by wt. | Metal[6] % by wt. | Appearance of Painted Surface |
| son 1 | | | | |

[1]Lead-borosilicate glass frit.
[2]Equal mixture of oxides of Co, Fe, Cr, Ni, and Cu.
[3]U.V. curable vehicle, Drakenfeld 1718 (TM), manufactured by Drakenfeld Co., Pittsburgh, Pennsylvania.
[4]Pine oil.
[5]Hot melt material, Ferro H-52 (TM), manufactured by Ferro Corp., Cleveland, Ohio.
[6]Zinc metal powder.

What is claimed is:

1. A process for preparing a formed glass sheet having a fired ceramic paint field thereon, the fired ceramic paint field being free from surface defects, comprising the steps of:
    A. providing a glass sheet, having a surface;
    B. applying to at least a portion of the surface a ceramic paint composition including a quantity of a metal powder; and
    C. heating the glass sheet and metal powder-containing ceramic paint thereon, while simultaneously conveying the glass sheet over gas hearth forming blocks, the surface of the glass sheet having the ceramic paint thereon being disposed adjacent the gas hearth forming blocks, the heating and conveying being sufficient to form the glass sheet, and vitrify and simultaneously fuse the ceramic paint to the glass sheet,
    the quantity of metal powder being effective to prevent surface defects on the fired ceramic paint field which otherwise would result from sliding engagement between the ceramic paint and the gas hearth forming blocks.

2. The process for preparing a formed glass sheet having a fired ceramic paint field thereon according to claim 1, wherein the glass sheet comprises soda-lime-silica glass.

3. The process for preparing a formed glass sheet having a fired ceramic paint field thereon according to claim 1, wherein the glass sheet comprises a glazing for automotive or architectural use.

4. The process for preparing a formed glass sheet having a fired ceramic paint field thereon according to claim 1, wherein the metal powder is selected from the group consisting of powders prepared from zinc, aluminum, tin, antimony, lead, bismuth, and alloys and mixtures thereof.

5. The process for preparing a formed glass sheet having a fired ceramic paint field thereon according to claim 4, wherein the metal powder comprises zinc metal powder.

6. The process for preparing a formed glass sheet having a fired ceramic paint field thereon according to claim 1, wherein the metal powder comprises from about 5% to about 50% by weight of the ceramic paint composition.

7. The process for preparing a formed glass sheet having a fired ceramic paint field thereon according to claim 1, wherein the metal powder comprises from about 20% to about 40% by weight of the ceramic paint composition.

8. A process for preparing a formed glazing for automotive or architectural use having a fired ceramic paint concealment band thereon, the fired ceramic paint concealment band being free from surface defects, comprising the steps of:
    A. providing a soda-lime-silica glass sheet, including a surface;
    B. applying to at least a portion of the surface a ceramic paint composition including from about 5% to about 50% by weight of a metal powder selected from the group consisting of powders prepared from zinc, aluminum, tin, antimony, lead, bismuth, and alloys and mixtures thereof; and
    C. heating the soda-lime-silica glass sheet and metal powder-containing ceramic paint thereon, while simultaneously conveying the glass sheet over gas hearth forming blocks, the surface of the glass sheet having the ceramic paint thereon being disposed adjacent the gas hearth forming blocks, the heating and conveying being sufficient to from the glass sheet, and vitrify and simultaneously fuse the ceramic paint to the glass sheet,
    the metal powder being effective to prevent surface defects on the fired ceramic paint concealment band which otherwise would result from sliding engagement between the ceramic paint and the gas hearth forming blocks.

9. The process for preparing a formed glazing having a fired ceramic paint field thereon according to claim 8, wherein the metal powder comprises zinc metal powder.

10. The process for preparing a formed glazing having a fired ceramic paint field thereon according to claim 8, wherein the metal powder comprises from about 20% to about 40% by weight of the ceramic paint composition.

11. A process for preparing a formed glazing for automotive or architectural use having a fired ceramic paint concealment band thereon, the fired ceramic paint concealment band being free from surface defects, comprising the steps of:
    A. providing a soda-lime-silica glass glazing, including a surface;
    B. applying to at least a portion of the surface a ceramic paint composition including from about 20% to about 40% by weight zinc metal powder; and
    C. heating the soda-lime-silica glass glazing and zinc metal powder-containing ceramic paint thereon, while simultaneously conveying the glass glazing over gas hearth forming blocks, the surface of the glass glazing having the ceramic paint thereon being disposed adjacent the gas hearth forming blocks, the heating and conveying being sufficient to form the glazing, and vitrify and simultaneously fuse the ceramic paint to the glazing,
    the zinc metal powder being effective to prevent surface defects on the fired ceramic paint concealment band which would otherwise result from sliding engagement between the ceramic paint and the gas hearth forming blocks.

* * * * *